KEYING DEVICE FOR ELECTRONIC OSCILLATION GENERATORS
Filed Sept. 11, 1957
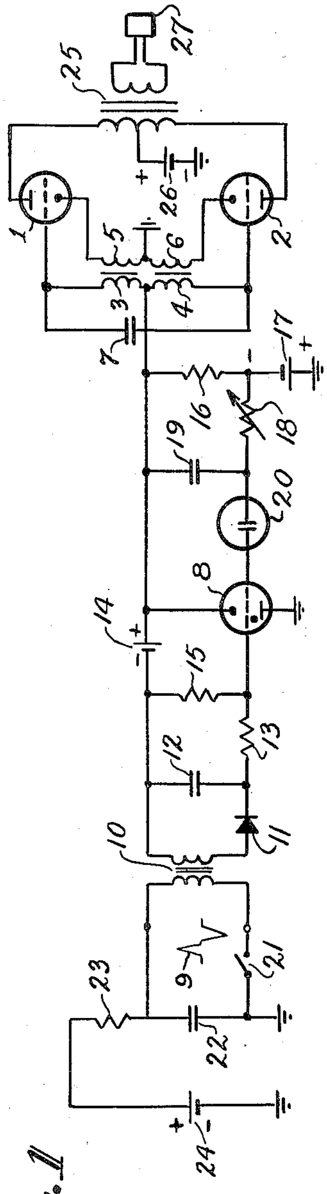
Fig. 1
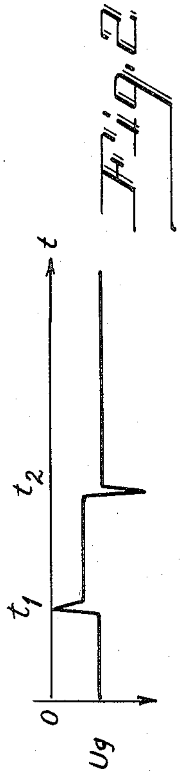
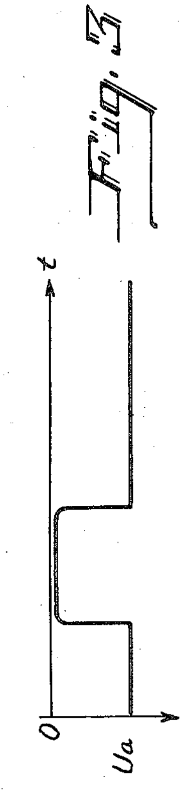
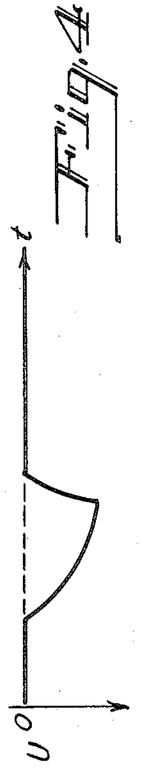

United States Patent Office 2,829,258

Patented Apr. 1, 1958

2,829,258

KEYING DEVICE FOR ELECTRONIC OSCILLATION GENERATORS

Hans Otten, Kiel-Holtenau, Germany, assignor to Electroacustic Gesellschaft mit beschränkter Haftung, Kiel, Germany, a corporation of Germany Application September 11, 1957, Serial No. 683,269

5 Claims. (Cl. 250—36)

My invention relates to a keying device for controlling the issuance of sonic, ultrasonic or higher-frequency wave trains from electronic oscillation generators for signalling, radar, echo-sounding, telemetering or similar purposes.

It is known to key an electronic-tube oscillation generator, operating in feedback self-exciting connection, by connecting a controllable gas discharge tube in the oscillator grid circuit and impressing upon the control grid of the discharge tube a positive start pulse and a subsequent negative stop pulse so that those pulses determine the beginning and the end respectively of the oscillations of the tube being keyed. Electronic keying devices of this type obviate the disadvantages of directly operating keying means comprising a mechanical switch for controlling the beginning and the end of the keying pulse.

It is an object of my invention to further improve electronic keying devices generally of the above-mentioned kind, so that an extraneously applied pulse is needed only for starting the generation or issuance of the oscillations to be keyed, whereas the terminating keying pulse is automatically produced within the keying device itself as a result of the electronic keying-switch means or gas discharge tube becoming conductive in response to the starting pulse.

According to my invention, I connect an electronic switching member, preferably a grid-controlled gaseous discharge tube, serially in the oscillator control circuit such as the grid circuit of the oscillator tube, and I connect the control electrode or grid of the gaseous switching tube not only with a signal input circuit for the positive starting pulse but also with a capacitor and a discharge gap, both connected in series between the control electrode and the cathode of the switching tube; and I further connect the capacitor in series with a resistor, preferably of adjustable resistance, to a voltage source of such voltage that, after the switching tube commences conducting, the capacitor becomes charged from the source up to a voltage sufficient for the ignition or breakdown of the discharge gap. As a result, the capacitor discharges through the gap and thus provides a high negative voltage pulse which extinguishes the gaseous switching tube.

The invention will be further explained with reference to the drawing which, by way of example, shows in Fig. 1 the schematic circuit diagram of a keying device according to the invention applied to an electronic-tube oscillation generator of the push-pull type, and in Figs. 2, 3 and 4 three explanatory diagrams relating to the same embodiment.

According to Fig. 1, two push-pull connected oscillator tubes 1 and 2 have their respective control grids feedback-connected with the respective cathode circuits by transformer windings 3, 5 and 4, 6. The transformer windings form part of an oscillatory circuit which comprises a capacitor 7 for tuning the grid circuit of the oscillator to the desired oscillation frequency of the tubes 1 and 2. In the normal condition of rest, the tubes 1 and 2 are blocked by a negative grid bias supplied from a voltage source 17.

The keying circuit for on-off control of the oscillation generator is connected to the mid-tap between the windings 3 and 4 of the feedback transformer. The keying circuit comprises a controllable gas discharge tube 8 whose cathode is directly connected with the above-mentioned mid-tap between windings 3 and 4 of the feedback transformer, whereas the anode of gas discharge tube 8 is grounded and hence is connected through the mid-tap between transformer windings 5 and 6 with the respective cathodes of the oscillator tubes 1 and 2.

The grid circuit of the gas discharge tube 8, extending between the control grid and the cathode, comprises a grid-bias voltage source 14 and a grid resistor 15. During keying, the tube 8 is impressed with steep-front start pulses 9 which are supplied as positive signals to the grid of gas discharge tube 8 through input transformer 10, a rectifier 11 and a resistor 13, a capacitor 12 being connected across the series arrangement of transformer 10 and rectifier 11.

Also connected to the control grid of gaseous discharge tube 8 is a capacitor network comprising a discharge gap 20, a capacitor 19, and resistors 16 and 18. The capacitor network also includes a voltage source which, in the illustrated example, is identical with the above-mentioned source 17. The negative pole of source 17 is connected to that end of resistor 16 that is not in connection with the cathode of the gas discharge tube 8. Interposed between the capacitor 19 and the voltage source 17 is a control rheostat 18. Rheostat 18 permits varying the time constant of the capacitor discharge circuit formed by the voltage source 17, the resistor 18, the capacitor 19 and the interior resistance of the tube 8 when in ignited condition. The positive pole of voltage source 17, as well as the anode of the gas discharge tube 8, are grounded and hence are connected with each other as well as with the cathodes of the oscillator tubes 1 and 2.

The start pulse 9 is produced by closing and opening a switch 21 which controls the discharge circuit of a capacitor 22 charged through a resistor 23 from a voltage source 24. Connected in the anode circuit of tubes 1 and 2 is an impedance-matching transformer 25 whose primary has a mid-tap connected to the positive terminal of an anode-voltage source 26 and whose secondary is connected to a transducer 27 such as a sonic transmitter.

While in the above-described example, a single direct-voltage source 17 is used for feeding the capacitor discharge circuit comprising the discharge gap 20, as well as for providing the negative grid bias for oscillator tubes 1 and 2, it will be understood that, if desired, separate voltage sources may be used for these two respective purposes.

The operation of the device is as follows: The start pulse, after being transformed in transformer 10 and rectified by rectifier 11, is impressed upon the grid of the switching tube 8 and causes the normally non-conducting tube to become ignited. Due to conductance of tube 8 and the fact that its interior resistance is now small, the capacitor 19 is now charged from source 17 through the control rheostat 18 and through the plate circuit of tube 8. When the capacitor charge attains a sufficient magnitude, the discharge gap 20 breaks down and commences to conduct so that the capacitor 19 is instaneously discharged through gap 20 and through the grid resistor 15 of the discharge tube 8. The resulting high negative pulse has the effect of extinguishing the controllable gas discharge tube 8.

In the coordinate diagram of Fig. 2, the abscissa denotes time and the ordinate denotes the grid voltage Ug at the control grid of tube 8. It will be recognized that the positive start pulse occurs at $t_1$. The negative stop pulse also impressed upon the grid of tube 8 is indicated at $t_2$.

Fig. 3 represents a time diagram of the anode voltage U$a$ of tube 8 as it occurs as a result of the start and stop pulses shown in Fig. 2.

Fig. 4 exemplifies the time curve of the voltage U across the capacitor 19 which determines the production of the negative stop pulse at tube 8. The steepness of the capacitor charging voltage, represented in Fig. 4 by the curve descending from the left toward the right, can be varied by changing the adjustment of the control rheostat 18. This affords regulating within wide limits the time interval $t_2—t_1$ between the start pulse and the stop pulse.

A particular advantage of a keying device according to the invention, as embodied in the above-described example, is the fact that it permits the impulse duration during which the oscillator tubes 1 and 2 are "open" to be adjusted and varied within wide limits and independently of the frequency of succession of the start pulses. Another advantage is the fact that the oscillator tubes can be operated with grid current whose magnitude has no influence upon the pulse duration.

It will be obvious to those skilled in the art, upon a study of this disclosure, that my invention is not limited to the illustrated embodiment. For example, and as mentioned above, separate voltage sources may readily be used for producing the grid bias for oscillator tubes 1 and 2 on the one hand, and for charging the capacitor 19 on the other hand. Furthermore, the duration of the keying pulses can be effected by using a variable capacitor instead of the fixed capacitor 19. Also, the charging voltage can be supplied to capacitor 19 from a source of constant voltage through a voltage-dividing potentiometer rheostat. By thus providing for an adjustable charging voltage, the ignition of the discharge tube 8, without change in the time constant of the circuit formed by capacitor 19 and resistor 18, can be made to occur at an earlier or later moment depending upon the selected setting of the potentiometer rheostat. The ignition moment of the discharge gap can also be controlled or varied by a suitable choice of discharge tubes of respectively different ignition voltage.

I claim:

1. With an electronic oscillation generator having an oscillation control circuit, the combination of a keying device comprising a controllable gas discharge tube connected in said control circuit and having a cathode and a control grid to be impressed by a positive start pulse and a negative stop pulse determining the beginning and end respectively of the oscillations of the generator being keyed, signal input means connected to said grid for supplying said positive start pulse, a discharge gap and a capacitor connected in series with each other between said grid and said cathode, a voltage source of normally constant voltage, and a resistor connected in series with said capacitor and in series with said discharge tube across said voltage source, whereby said capacitor upon ignition of said tube is first charged from said source up to response of said gap whereafter said capacitor discharges through said gap to supply said negative stop pulse.

2. In an oscillator keying device according to claim 1, said resistor having adjustable resistance for varying the time constant of the capacitor discharge to control the time spacing of said stop pulse from said start pulse.

3. In an oscillator keying device according to claim 1, said voltage source comprising an adjustable divider having a tapped-off portion for providing said capacitor-charging voltage, whereby a change in adjustment of said voltage divider causes a change in the time spacing of said stop pulse from said start pulse.

4. With an electronic oscillation generator having an oscillation control circuit, the combination of a keying device comprising a controllable gas discharge tube connected in said control circuit and having a cathode and a control grid to be impressed by a positive start pulse and a negative stop pulse determining the beginning and end respectively of the oscillations of the generator being keyed, signal input means connected to said grid for supplying said positive start pulse, a discharge gap and a capacitor connected in series with each other between said grid and said cathode, a voltage-source member and a resistance member serially connected across said capacitor through said tube, whereby said capacitor upon ignition of said tube is first charged from said source up to response of said gap whereafter said capacitor discharges through said gap to supply said negative stop pulse, at least one of said members being adjustable for varying the time constant of the capacitor discharge to thereby control the time spacing of said stop pulse from said start pulse.

5. With an electronic oscillation generator having an oscillation control circuit, the combination of a keying device comprising a static electronic switching means having two main electrodes series-connecting said switching means in said oscillation control circuit, said electronic switching means having a control electrode to be impressed by a start pulse of a given polarity for closing said oscillation control circuit and by a stop pulse of the opposite polarity for opening said oscillation control circuit so as to determine the beginning and the end respectively of the oscillations being keyed, signal input means connected to said control electrode for supplying said start pulse, a discharge gap and a capacitor connected in series with each other between said control electrode and one of said other electrodes, a direct-voltage source, and a resistor connected in series with said capacitor and in series with said electronic switching means across said voltage source, whereby said capacitor upon initiation of conductance in said electronic switching means is first charged from said source until breakdown of said gap and is then discharged through said gap to supply said stop pulse.

No references cited.